United States Patent Office 3,542,890
Patented Nov. 24, 1970

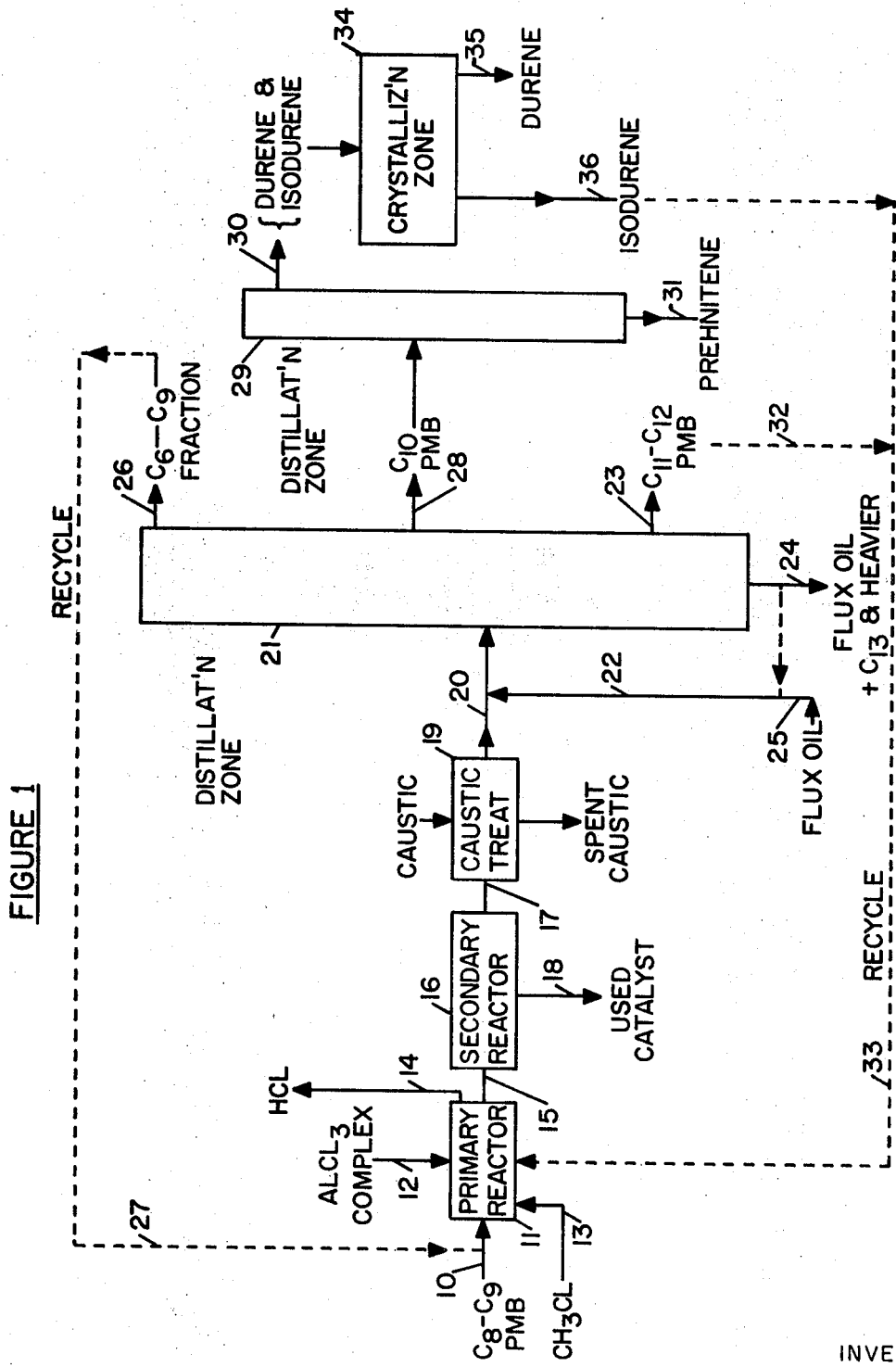

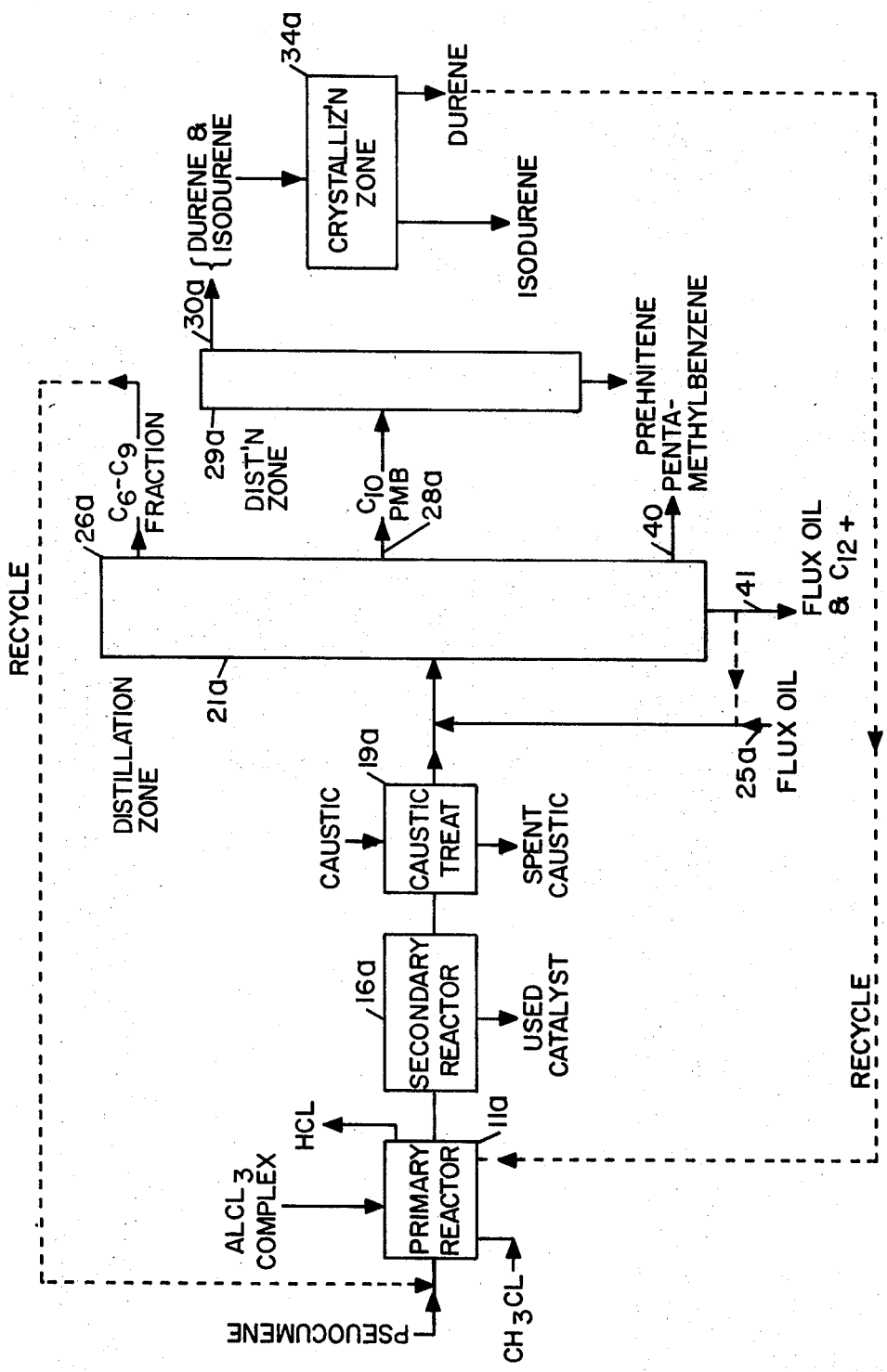

3,542,890
ALKYLATION AND ISOMERIZATION PROCESS
Harold W. Earhart, Corpus Christi, Tex., and Gerald Sugerman, Parsippany, N.J., assignors to Sun Oil Company, Philadelphia, Pa., a corporation of New Jersey
Continuation-in-part of application Ser. No. 797,313, Dec. 30, 1968, which is a continuation-in-part of application Ser. No. 761,211, Sept. 20, 1968. This application Aug. 20, 1969, Ser. No. 851,712
Int. Cl. C07c 3/62
U.S. Cl. 260—672    21 Claims

ABSTRACT OF THE DISCLOSURE $C_{10}$–$C_{11}$ polymethylbenzenes are prepared by reacting polymethylbenezs of lower molecular weight with methyl chloride in the presence of a small proportion of aluminum chloride catalyst under conditions which first yield substantial amounts of hexamethylbenzene along with the desired $C_{10}$–$C_{11}$ polymethylbenzene. The reaction product is then equilibrated in a second step to minimize the hexamethylbenzene content and maximize the production of desired $C_{10}$–$C_{11}$ polymethylbenzenes. Specific product hydrocarbons are durene, isodurene, prehnitene and pentamethylbenzene, which are useful intermediates for preparing various aromatic derivatives, e.g., polyacids or their anhydrides that have utility in polymer manufacture or polyesters useful as plasticizers.

CROSS REFERENCES TO RELATED APPLICATIONS

This application is a continuation-in-part of application Ser. No. 797,313, filed Dec. 30, 1968 which is in turn a continuation-in-part of application Ser. No. 761,211, filed Sept. 20, 1968, now abandoned.

This invention relates to the preparation of $C_{10}$–$C_{11}$ polymethylbenzenes, i.e., tetramethylbenzenes and pentamethylbenzenes, from xylenes and/or trimethylbenzenes by catalytic liquid phase reaction of these lower molecular weight polymethylbenzenes with mthyl chloride. Specific hydrocarbons that can be made by the invention are durene, isodurene, prehnitene and pentamethylbenzene.

The catalyst used for the present process is aluminum chloride and the process employs an unusually low level of the catalyst.

Aluminum chloride as a catalyst for the alkylation of substituted benzenes, such as xylenes and trimethylbenzenes, has been known to the art for many years. Examples of references which disclose the reaction of such polymethylbenzenes with methyl chloride are: Boynton and Edwards United States Pat. 2,896,001, issued July 21, 1959; Boynton and Edwards United States Pat. 2,976,335, issued Mar. 21, 1961; and Earhart and Nicholson United States Pat. 3,031,513, issued Apr. 24, 1962. Typically the catalyst concentration in such processes is about 15% (based on moles of aluminum chloride per 100 moles of polymethylbenzene feed), though lower and higher proportions have been suggested. These comparatively high catalyst concentrations, while giving good reaction rates, result in processing disadvantages. Catalyst consumption and the chloride content of the hydrocarbon product both tend to be high. Also when conventional catalyst levels are employed, economics dictate that the catalyst be carefully recovered and reused.

The present process utilizes a low enough level of the aluminum chloride catalyst that no recovery of catalyst is required. Specifically the amount of catalyst employed is in the range of 0.2–3.0 mole percent $AlCl_3$ based on the polymethylbenzene feed, more preferably 1.0–2.5%. This proportion is low enough to permit the used catalyst to be discarded. Furthermore, the use of this low catalyst dosage without catalyst recycle gives a hydrocarbon product containing only an insignificant amount of organic chlorides. The chlorides that are present are essentially inorganic ($AlCl_3$ and HCl), and these can readily be removed by water washing. In contrast, when conventional catalyst levels are used, the product has a high organic chloride content, necessitating an alkaline hydrolysis treatment at high temperature to reduce the chloride content to a satisfactory value.

We have now found that when a low catalyst level as herein specified is used in conjunction with a temperature providing a suitable rate of reaction between methyl chloride and the polymethylbenzene feed, the direct product of the reaction will contain an unexpectedly large amount of $C_{11}$–$C_{12}$ polymethylbenzenes. This causes the yield of tetramethylbenzenes to be correspondingly less. Thus, if a tetramethylbenzene (e.g., durene) is the desired product, the proportion of it that is recoverable from the direct alkylation product is relatively low because of the unexpected presence of the $C_{11}$–$C_{12}$ polymethylbenzenes in substantial proportions. We have further found that the amount of these higher polymethylbenzenes—particularly the hexamethylbenzene—can be significantly reduced by following the alkylation reaction step with an equilibration reaction step wherein the same catalyst is contacted with the reaction mixture in the absence of methyl chloride. This causes the hexamethylbenzene content to be sharply reduced while also causing some reduction in pentamethylbenzene content; and the tetramethylbenzene content of the mixture increases correspondingly. The molar ratio of petamethylbenzene to hexamethylbenzene is considerably higher in the equilibrated product than in the direct alkylation product.

FIGS. 1 and 2 of the accompanying drawings are schematic flowsheets of processes embodying the invention. These can be continuous processes or, alternatively, the steps thereof can be practiced as batch operations.

In one aspect the invention is used for making one or more tetramethylbenzenes from a polymethylbenzene feed of lower molecular weight. This is described hereinafter in conjunction with FIG. 1 of the drawings. In another embodiment of the invention, described with reference to FIG. 2, the invention is employed to produce pentamethylbenzene from the same kind of feed. In the latter case one or more tetramethylbenzenes optionally may also be recovered from the process.

In all embodiments of the invention the alkylation reaction step is followed by an equilibration reaction step which causes a marked reduction in the hexamethylbenzene content of the mixture. This results in distinct processing advantages during recovery of desired products from the reaction mixture by avoiding handling problems otherwise encountered due to the high melting point of hexamethylbenzene (329.5° F.), as more fully explained hereinafter.

The aluminum chloride catalyst preferably is used in the form of a liquid complex which is pre-made from $AlCl_3$, HCl and the polymethylbenzene material used as feed for the process (e.g., pseudocumene). The complex can readily be prepared by adding powdered anhydrous aluminum chloride to 250 mole percent of pseudocumene (or other polymethylbenzene) and passing dry HCl into the mixture until it becomes saturated. In place of HCl methyl chloride can be passed into the mixture, since the methyl chloride will produce HCl in situ thus giving the same result. The catalyst complex will be completely formed within one hour and will appear as a heavy oily layer beneath any excess pseudocumene. The catalyst can be stored at ambient temperature under anhydrous conditions until needed.

In order to illustrate benefits of the invention, the following comparative examples are given. These represent batch reactions in which pseudocumene (99.1% purity) is alkylated with methyl chloride. In each case a glass reactor having a stirrer and immersed in an oil bath provided with means for heating and cooling is used. Gaseous methyl chloride is fed through a meter and drying column and is introduced into the reactor through a sparger. The off-gas stream from the reactor is passed successively through water scrubbers for removing HCl, a drying column and a meter for measuring the amount of any unreacted methyl chloride.

Example I

A catalyst complex prepared as described above and containing 0.16 mole of $AlCl_3$ is added to the reactor containing 10 moles of heated pseudocumene under nitrogen. This is equivalent to 1.6 mole percent $AlCl_3$ based on the feed hydrocarbon. While the mixture is being stirred with the temperature maintained at about 137° C. (279° F.), a stream of methyl chloride is fed into the mixture over a period of 80 minutes. The amount of methyl chloride reacted during this time is such that the average number of carbon atoms per molecule of polymethylbenzene is raised from 9.0 to about 9.9. Addition of methyl chloride is then stopped and a sample of reaction product is immediately taken for GLPC analysis. Stirring of the reaction mixture is continued at the same temperature level for a total of 60 minutes after the addition of methyl chloride has been stopped, and samples for analysis are also taken at equilibration times of 15 and 60 minutes. Results are shown in Table I.

TABLE I

| Composition of reaction product, wt. percent | Equilibration time (279° F.) | | |
|---|---|---|---|
| | 0 minutes | 15 minutes | 60 minutes |
| Xylenes | 7.4 | 5.6 | 3.0 |
| $C_9$ PMB (trimethylbenzenes): | | | |
| Mesitylene (1,3,5) | 7.2 | 6.3 | 5.8 |
| Pseudocumene (1,2,4) | 24.0 | 19.1 | 14.4 |
| Hemimellitene (1,2,3) | 1.7 | 1.1 | 1.3 |
| Total | 32.9 | 26.5 | 21.5 |
| $C_{10}$ PMB (tetramethylbenzenes): | | | |
| Durene (1,2,4,5) | 16.7 | 24.3 | 30.7 |
| Isodurene (1,2,3,5) | 14.3 | 19.8 | 26.3 |
| Prehnitene (1,2,3,4) | 4.5 | 4.6 | 4.6 |
| Total | 35.5 | 48.7 | 61.6 |
| $C_{11}$–$C_{12}$ PBM: | | | |
| Pentamethylbenzene | 15.0 | 16.2 | 12.2 |
| Hexamethylbenezne | 8.0 | 2.1 | 0.3 |
| Avg. No. of carbon atoms | 9.9 | 9.9 | 9.9 |

The results given in Table I illustrate the marked reduction in hexamethylbenzene content of the product that can be achieved by following the alkylation step with an equilibration step. In this case the hexamethylbenzene content is reduced from 8.0% to an almost negligible value, viz. 0.3%. This is highly desirable from an operating standpoint in working up the reaction product, since hexamethylbenzene is difficult to handle in plant practice in view of its high melting point (329.5° F.). The equilibration also effects some reduction in pentamethylbenzene content (15.0% v. 12.2%), but the molar ratio of pentamethylbenzene to hexamethylbenzene increased from about 1.9 to about 40. This result would be highly advantageous if the total $C_{11}$–$C_{12}$ fraction were to be distilled as a separate cut in plant practice, since this cut without equilibration would have too high a melting point to be handled readily whereas the equilibrated cut would have a much lower melting point near that of pure pentamethylbenzene (129.7° F.) and could much more easily be maintained in liquid form in plant practice.

The results in Table I also show that the equilibration reaction increases the yield of tetramethylbenzenes. In this case the total tetramethylbenzene content is increased from 35.5% in the direct alkylation product to 61.6% in the final equilibrated product. A corresponding reduction in the other components of the reaction mixture occurs during equilibration. These composition changes occur as a result of disproportionation and transalkylation reactions that take place and change molecular weights of the polymethylbenzene components. From the data it can be determined that, for these conditions, durene production increases about 84% and isodurene production increases by about the same factor when the alkylation step is followed by an equilibration step.

Example II

This is a comparative example carried out in generally the same way as Example I but using a more conventional catalyst level. The reactor contains 6.67 moles of pseudocumene and 0.80 mole of aluminum chloride complex, corresponding to 12.0 mole percent $AlCl_3$ based on hydrocarbon feed. The alkylation reaction is carried out at about 127° C. (261° F.) by passing methyl chloride into the stirred mixture for 55 minutes at which time the average number of carbon atoms per molecule of polymethylbenzene has increased to about 10.4. Addition of methyl chloride is then stopped and stirring of the reaction mixture at the same temperature is continued for 60 minutes to effect equilibration. Results of product analyses are given in Table II.

TABLE II

| Composition of reaction product, wt. percent | Equilibration time | |
|---|---|---|
| | At start | 60 minutes |
| Xylenes | 0.5 | 0.4 |
| $C_9$ PMB (trimethylbenzenes): | | |
| Mesitylene (1,3,5) | 4.3 | 3.7 |
| Pseudocumene (1,2,4) | 8.0 | 6.8 |
| Hemimellitene (1,2,3) | 0.9 | 0.7 |
| Total $C_{9s}$ | 13.2 | 11.2 |
| $C_{10}$ PMB (tetramethylbenzenes): | | |
| Durene (1,2,4,5) | 31.0 | 29.8 |
| Isodurene (1,2,3,5) | 24.4 | 23.7 |
| Prehnitene (1,2,3,4) | 2.0 | 4.6 |
| Total $C_{10s}$ | 57.4 | 58.1 |
| $C_{11}$–$C_{12}$ PMB: | | |
| Pentamethylbenzene | 25.9 | 26.8 |
| Hexamethylbenzene | 1.3 | 1.1 |
| Avg. No. of carbon atoms | 10.3 | 10.4 |

Comparison of the two sets of analyses in Table II shows that in this case employing a conventional level of catalyst, hardly any change in composition of the alkylation product is brought about by providing an equilibration period after the alkylation reaction. Within the limits of accuracy of the analytical method used, the compositions of the direct alkylation product and the equilibrated product are nearly the same.

The final reaction products of Examples I and II when washed with distilled water several times at about room temperature to remove inorganic chlorides (HCl, $AlCl_3$) and then analyzed for organic chloride content show a great difference in organic chloride levels. Typically the product of Example I has less than 10 p.p.m. of residual organic chloride, whereas that of Example II has of the order of 900 p.p.m. of residual organic chloride. This illustrates another advantage in using the unusually low level of catalyst employed in the present invention.

As fresh feed material for the present process, any of the $C_8$–$C_9$ polymethylbenzenes or any mixture of such polymethylbenzenes can be used. Also any of the polymethylbenzenes present in the final reaction mixture and not desired as products of the process can be recovered and recycled for further conversion to desired products. This includes any $C_8$–$C_{12}$ material other than the desired product or products as well as any benzene and toluene that may be formed in small amounts. On the other hand, some $C_{13}$ and heavier material of unknown composition usually is formed in relatively small amounts and provision should be made to discard this rather than allowing the same to be recycled and build up in the system. The polymethylbenzene feed mixture introduced to the alkylation reaction zone generally should have an average of 8.0–9.5 carbon atoms per molecule, more preferably 8.5–9.5. Preferred feed materials are those having an average number of carbon atoms as specified and containing pseudocumene in greater amount than any other component, since this is the most prevalent $C_9$ aromatic hydrocarbon in petroleum stocks. The amount of methylchloride reacted with the feed mixture is at least enough to yield an alkylate in which tetramethylbenzenes constitute the main reaction product. At the end of the alkylation period the average number of carbon atoms per molecule of the polymethylbenzene mixture generally will be in the range of 9.5–10.7. When pentamethylbenzene is a desired product, usually enough methyl chloride should be reacted to raise this average to at least 10.0.

With reference now to FIG. 1, a specific embodiment is described wherein it is assumed that the two tetramethylbenzenes, durene and prehnitene, are the only alkylation products desired. Remaining reaction products are recycled. For convenience the term "PMB" is used herein and in the drawings to mean one or more polymethylbenzenes of the carbon atoms indicated.

In FIG. 1, fresh feed material, indicated as $C_8$–$C_9$ PMB, is fed through line 10 to primary reactor 11 to which preformed aluminum chloride complex is also introduced via line 12. The amount of catalyst should be maintained in the range of 0.2–3.0 mole percent based on total PMB within reactor 11 and more preferably 1.0–2.5 mole percent. The reactor is provided with suitable stirring means (not shown) to keep the mixture well agitated. Dry gaseous methyl chloride is introduced through line 13, and by-product HCl, along with any unreacted methyl chloride, is removed through line 14. The temperature in primary reactor 11 should be in the range of 200–235° F. and more preferably is kept within the range of 260–300° F.

After the reaction mixture has had sufficient residence time in primary reactor 11 to result in the desired increase in average number of methyl groups per PMB molecule, the mixture passes through line 15 to secondary reactor 16 wherein mixing of the catalyst and hydrocarbon phases is continued in the absence of methyl chloride to cause equilibration. The temperature in secondary reactor 16 likewise should be in the range of 220–325° F., more preferably 260–300° F., and conveniently can be about the same temperature as maintained in the first reactor. The equilibration reaction that occurs in reactor 16 decreases the $C_{11}$–$C_{12}$ PMB content of the mixture, especially lowering the hexamethylbenzene content, and substantially increases the tetramethylbenzene content. This equilibration reaction also effects a reduction in the $C_8$ and $C_9$ PMB contents and a corresponding increase in the amounts of tetramethylbenzenes. The equilibrated product is removed via line 17, and the used catalyst is separately withdrawn as indicated by line 18. The product is then neutralized in the caustic treating step indicated at 19 and, if desired, can be water washed (not shown) to remove any residual caustic.

While the primary and secondary reactors as schematically illustrated in FIG. 1 are indicated as separate zones for operating in continuous fashion, a single batch reactor can be used, with the alkylation and equilibration steps being carried out therein successively. Typical reaction times, when utilizing a temperature of about 280° F. and a catalyst level of 2%, are 30–100 minutes for the alkylation reaction and 20–80 minutes for the equilibration reaction.

By way of example, utilizing pseudocumene as the fresh feed, a temperature level of about 285° F. for both alkylation and equilibration, a catalyst level of 2%, an alkylation reaction time of 90 minutes, an equilibration time of 30 minutes, and an amount of methyl chloride such that 0.75 mole is reacted per mole of PMB, the reaction product compositions given in Table III are representative.

TABLE III

| Composition of reaction product, wt. percent | Composition, wt. percent | |
|---|---|---|
| | Direct alkylation product | After Equilibration |
| Toluene | Trace | Trace |
| Xylenes | 7.0 | 3.5 |
| $C_9$ PMB (trimethylbenzenes): | | |
| Mesitylene (1,3,5) | 9.0 | 6.9 |
| Pseudocumene (1,2,4) | 18.0 | 13.8 |
| Hemimellitene (1,2,3) | 3.0 | 2.3 |
| Total $C_{9s}$ | 30.0 | 23.0 |
| $C_{10}$ PMB (tetramethylbenzenes): | | |
| Durene (1,2,4,5) | 18.0 | 28.0 |
| Isodurene (1,2,3,5) | 18.0 | 27.0 |
| Prehnitene (1,2,3,4) | 4.0 | 5.0 |
| Total $C_{10s}$ | 40.0 | 60.0 |
| $C_{11}$–$C_{12}$ PMB: | | |
| Pentamethylbenzene | 16.0 | 13.0 |
| Hexamethylbenzene | 7.0 | 0.5 |
| Avg. No. of carbon atoms | 9.74 | 9.76 |

The average molecular weight of this product (before or after equilibration) is about 130.7.

From the data in Table III it can be seen that, for the conditions specified, the equilibration reaction would have the following effects:
 (1) Xylenes decrease by 50%.
 (2) Total $C_9$ PMB decreases by 23%.
 (3) Pentamethylbenzene decreases by 19%.
 (4) Hexamethylbenzene decreases by 93%.
 (5) Total $C_{10}$ PMB increases by 50%.

The large decrease in hexamethylbenzene content is particularly advantageous in avoiding handling problems in subsequent steps of the process.

With further reference to FIG. 1, the caustic treated product is sent through line 20 to a distillation zone 21 for separating the product into fractions as shown. This can be done continuously employing a plurality of distillation colums or batchwise using a single column. In any event it is desirable to add a flux oil, as indicated by line 22, to provide reboiler bottoms for the distillation zone from which the $C_{11}$–$C_{12}$ PMB fraction can be distilled as indicated by line 23. The flux oil should be a high boiling oil that is thermally stable at 675° F., such as a solvent treated neutral oil having a viscosity of about 600 SUS @ 100° F. and containing an oxidation inhibitor. Any $C_{13}$ and heavier material that may have formed during the reaction in reactors 11 and 16 will accumulate in the flux oil. Flux oil with the heavy reaction products can be removed whenever desired through line 24 and fresh flux oil can be added to replace it by means of line 25.

From distillation zone 21 all material boiling below the tetramethylbenzene range can be recovered via line 26 as the lightest cut, designated in FIG. 1 as a $C_6$–$C_9$ fraction. Generally this fraction will be mainly composed of $C_9$ PMB, small amounts of xylenes and toluene, and only a negligible amount of benzene. The entire fraction can be recycled, as indicated by line 27, to primary reactor 11 for further conversion to the desired products.

The $C_{11}$–$C_{12}$ PMB fraction from line 23 will, in view of the equilibration effected in reactor 16, contain only a small amount of hexamethylbenzene and be composed mainly of pentamethylbenzene as previously shown. Since the latter has a melting point of 129.7° F., condenser temperatures can readily be regulated in practice to avoid any danger of freeze-up in the process. In contrast, if the equilibration step were omitted, solidification of the $C_{11}$–$C_{12}$ PMB fraction in equipment would be difficult to avoid. The $C_{11}$–$C_{12}$ PMB can be recycled through lines 32 and 33 to primary reactor 11 for further conversion.

An intermediate fraction composed of $C_{10}$ PMB is taken from distillation zone 21 through line 28 and sent to another distillation zone 29 operated to take a durene and isodurene binary mixture overhead, as indicated by line 30, and to obtain prehnitene via line 31 as a product of the process. This separation between prehnitene (B.P.=401° F.) on the one hand and durene (B.P.= 386° F.) and isodurene (B.P.=388° F.) on the other can readily be done under good fractionating conditioners to yield prehnitene in high purity.

The separation between durene and isodurene can be carried out in known manner by selective crystallization of the durene in crystallization zone 34. Procedures for achieving this separation have been described in numerous patents, for example, Schmidl U.S. Pat. 2,560,373, issued July 10, 1951, and Walker U.S. Pat. 2,914,582, issued Nov. 24, 1959. Purified durene is removed from the system through line 35 as the other product of the process. The isodurene fraction, indicated at line 36, can be recycled via line 33 for further conversion.

With reference now to FIG. 2, another embodiment of the invention is shown wherein it is assumed that the fresh feed is pseudocumene, that three individual PMB products are desired, namely, prehnitene, isodurene and pentamethylbenzene, and that all other products except $C_{12}$ and higher materials are to be recycled. The process is generally similar to that previously described, again including primary reactor 11a, secondary reactor 16a, caustic treater 19a, distillation zones 21a and 29a, and crystallization zone 34a. The temperature in the reactors and the molar proportion of catalyst to total PMB (pseudocumene plus recycle) are similar to the levels previously described. In this case, however, a greater amount of methyl chloride is employed so that the average number of carbon atoms per molecule of alkylation product is in the range of 10.0–10.7, for example, 10.4. The products from reactors 11a and 16a thus will contain larger amounts of pentamethylbenzene than shown for the products of Table III.

From distillation zone 21a, a $C_6$–$C_9$ fraction is taken through line 26a and recycled, and a $C_{10}$ PMB cut is passed through line 28a to distillation zone 29a for again recovering prehnitene as bottom product. The distillate passes through line 30a to crystallizer 34a for separation into isodurene and durene fractions. As shown in FIG. 2, in this case durene is recycled to the primary reactor while isodurene is withdrawn as a product of the process. Another variation in this embodiment is that pentamethylbenzene is taken as a separate fraction, as indicated by line 40, and the small amount of hexamethylbenzene produced is allowed to remain in the flux oil along with any higher boiling product. The flux oil is withdrawn occasionally or continuously, as desired, through line 41, being replaced by fresh flux oil from line 25a, so as not to allow the hexamethylbenzene content thereof to increase to a level at which it might solidify within the equipment. Since the equilibration step in reactor 16a reduces the hexamethylbenzene to a low level, no inordinate loss of PMB material is experienced by operating in this manner. In contrast, operation in this fashion but without the equilibration step of reactor 16a would result in an excessive loss of PMB material from the system.

The process of FIG. 2 can, if desired, be varied to produce only high purity pentamethylbenzene as the desired product. In such case the entire $C_{10}$ PMB material indicated at line 28a would be recycled to primary reactor 11a in addition to the entire $C_6$–$C_9$ fraction at line 26. In fact these materials could be taken from distillation zone 21a as a single fraction which is recycled to extinction. When operating in this manner the only hydrocarbon material that is not converted to pentamethylbenzene is the relatively small amount of hexamethylbenzene and higher material retained in the flux oil.

The several polymethylbenzenes that can be produced in operating the invention are valuable as chemical intermediates for making a variety of products having known utilities. Numerous uses for these hydrocarbons have been described by H. W. Earhart in the book Polymethylbenzenes, published by Noyes Development Corp. (1969), U.S. Library of Congress Catalog Card No. 74–75387. These polymethylbenzenes are particularly useful as intermediates for producing aromatic polyacids or their anhydrides, such as pyromellitic dianhydride or mellophanic dianhydride, which are desirable as curing agents for epoxy resins or for making polymers useful as high melt coating materials, and corresponding esters useful as plasticizers for polyvinyl chloride resins.

The invention claimed is:

1. Process of preparing tetramethylbenzene from a polymethylbenzene feed of lower molecular weight which comprises:
    (a) contacting a polymethylbenzene feed having an average of 8–9.5 carbon atoms per molecule with methyl chloride at a temperature in the range of 200–325° F. and with an aluminum chloride catalyst in proportion of 0.2–3.0 mole percent $AlCl_3$ based on said feed, said contacting with methyl chloride being continued until enough methyl chloride has reacted to yield a mixture containing tetramethylbenzenes as the main reaction product together with a substantial proportion of $C_{11}$–$C_{12}$ polymethylbenzenes;
    (b) discontinuing said contacting wtih methyl chloride and continuing the contacting with said catalyst at a temperature in the range of 200–325° F. until a substantial decrease in the $C_{11}$–$C_{12}$ polymethylbenzene content and a concurrent increase in the tetramethylbenzene content of the reaction mixture has occurred; and
    (c) recovering from the reaction mixture at least one tetramethylbenzene in higher yield than would be obtainable from the reaction product of step (a).

2. Process according to claim 1 wherein pseudocumene is present in greater amount than any other component in said polymethylbenzene feed.

3. Process according to claim 2 wherein durene is recovered in step (c).

4. Process according to claim 2 wherein isodurene is recovered in step (c).

5. Process according to claim 2 wherein prehnitene is recovered in step (c).

6. Process according to claim 1 wherein at least two tetramethylbenzene isomers are separately recovered from the reaction product of step (b) each in higher yield than would be obtainable from the reaction product of step (a).

7. Process according to claim 6 wherein durene and prehnitene are separately recovered.

8. Process according to claim 1 wherein at least a portion of the reaction product other than the recovered tetramethylbenzene is recycled to step (a) for reaction as a component of said polymethylbenzene feed.

9. Process according to claim 8 wherein durene is recovered in step (c).

10. Process according to claim 8 wherein isodurene is recovered in step (c).

11. Process according to claim 8 wherein prehnitene is recovered in step (c).

12. Process according to claim 9 wherein two tetramethylbenzene isomers are separately recovered from the reaction product of step (b) each in higher yield than would be obtainable from the reaction product of step (a).

13. Process according to claim 12 wherein said two isomers are durene and prehnitene.

14. Process according to claim 13 wherein reaction product containing isodurene is recycled to step (a).

15. Process according to claim 1 wherein the aluminum chloride catalyst is a pre-formed liquid complex of $AlCl_3$, HCl and polymethylbenzene and is used in proportion of 1.0–2.5 mole percent $AlCl_3$ based on said feed.

16. Process according to claim 15 wherein said temperatures in steps (a) and (b) are in the range of 260–300° F.

17. In a process wherein a polymethylbenzene feed having an average number of carbon atoms per molecule in the range of 8–9.5 is reacted with methyl chloride to produce a polymethylbenzene product having a higher average number of carbon atoms, the steps for producing pentamethylbenzene while minimizing production of hexamethylbenzene which comprise:

(a) contacting said feed with methyl chloride at a temperature in the range of 200–325° F. and with an aluminum chloride catalyst in proportion of 0.2–3.0 mole percent $AlCl_3$ based on said feed, until sufficient methyl chloride has reacted therewith to yield a polymethylbenzene reaction mixture having an average number of carbon atoms in the range of 9.7–10.7 and containing tetramethylbenzene, pentamethylbenzene and a substantial amount of hexamethylbenzene, (b) discontinuing said contacting with methyl chloride and continuing the contacting with the catalyst at a temperature in the range of 200–325° F. until a substantial decrease in the hexamethylbenzene content and an increase in the pentamethylbenzene:hexamethylbenzene ratio has occurred; and (c) recovering from the reaction mixture pentamethylbenzene as a high purity product.

18. Process according to claim 17 wherein at least one tetramethylbenzene is also recovered from the reaction mixture.

19. Process according to claim 18 wherein durene is recovered from the reaction mixture.

20. Process according to claim 17 wherein the aluminum chloride catalyst is a pre-formed liquid complex of $AlCl_3$, HCl and polymethylbenzene and is used in proportion of 1.0–2.5 mole percent $AlCl_3$ based on said feed.

21. Process according to claim 20 wherein said temperatures in steps (a) and (b) are in the range of 260–300° F.

References Cited

UNITED STATES PATENTS

| 2,403,124 | 7/1946 | Rosenquist et al. |
|---|---|---|
| 2,909,575 | 10/1959 | Saffer et al. |
| 3,013,513 | 4/1962 | Earhart et al. |
| 3,219,720 | 11/1965 | Binder et al. |
| 3,233,002 | 2/1966 | Kovach et al. |
| 3,375,290 | 3/1968 | Smeykal et al. |

DELBERT E. GANTZ, Primary Examiner

C. R. DAVIS, Assistant Examiner

U.S. Cl. X.R.

260—668, 671